Nov. 9, 1965  J. R. CASSANO  3,216,522
VEHICLE SPEED MAINTAINING CONTROL SYSTEM AND METHOD
Filed Aug. 28, 1963  3 Sheets-Sheet 1

INVENTOR.
James R. Cassano
BY
D. D. McGraw
HIS ATTORNEY

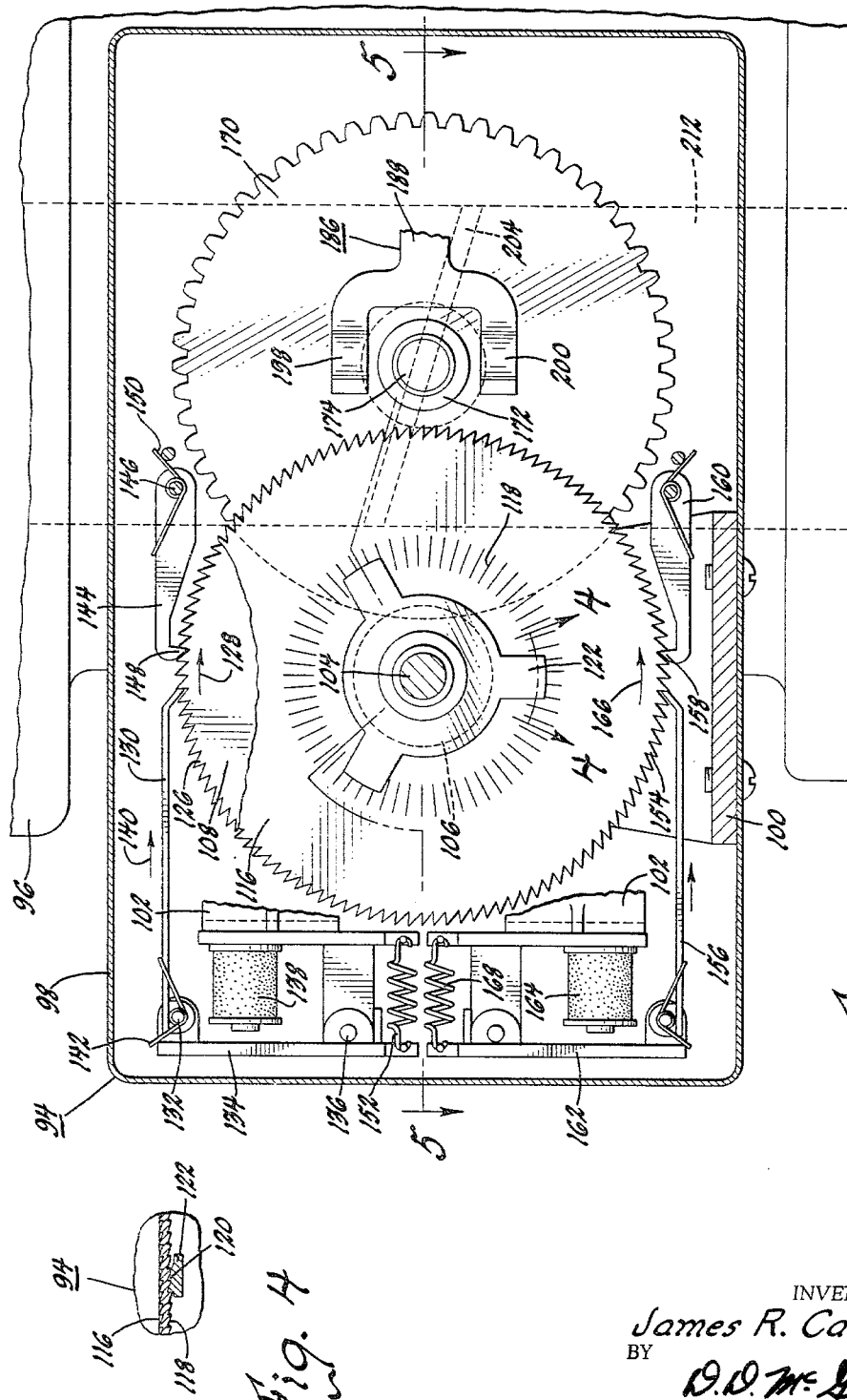

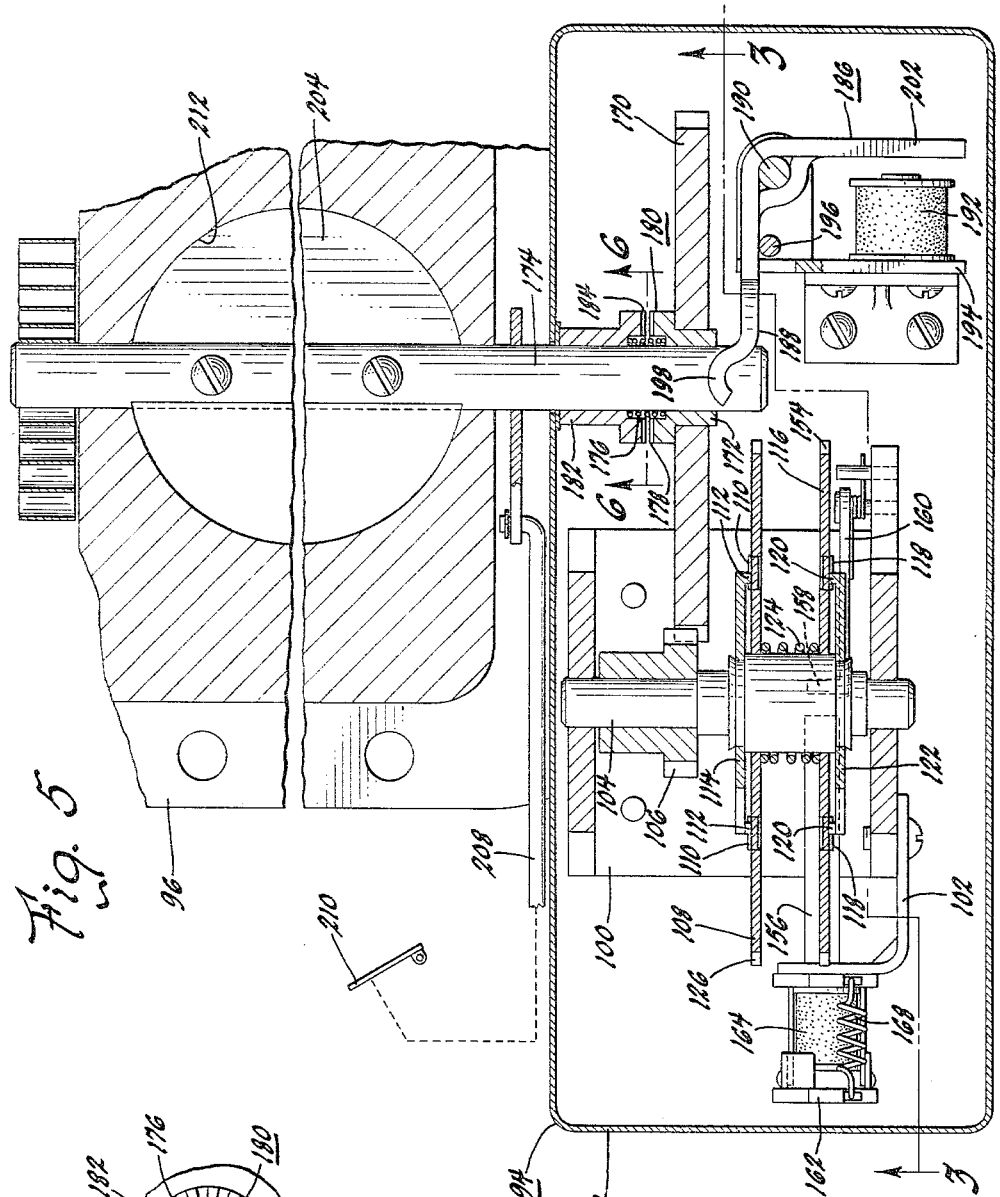
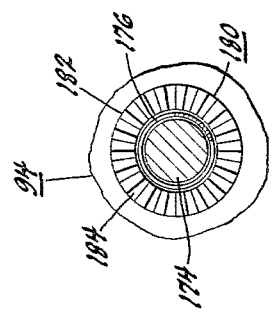

United States Patent Office 3,216,522
Patented Nov. 9, 1965

3,216,522
VEHICLE SPEED MAINTAINING CONTROL SYSTEM AND METHOD
James R. Cassano, Rochester, N.Y., assignor to General Motors Corporation, Detroit, Mich., a corporation of Delaware
Filed Aug. 28, 1963, Ser. No. 305,099
10 Claims. (Cl. 180—82.1)

This invention relates to a system and method for maintaining a vehicle at a desired set speed within permissible limits, and more particularly to a system which is position seeking rather than proportional control in operation, and a method for so controlling the vehicle speed. Mechanism embodying the invention is arranged to drive the throttle valve in the engine carburetor in the throttle opening direction and the throttle closing direction by an electromagnetically actuated ratchet wheel arrangement with the ratchet wheels driving through one way drive face gears and a clutch. The controller for the system includes an actual vehicle speed pickup having a contactor arranged in the same manner as the usual pointer of a speedometer. A set speed drum is provided with a pair of contacts having the contactor intermediate them. The contacts are electrically connected to timed switches which are alternately opened and closed by a suitable drive mechanism which may be driven in accordance with actual vehicle speed. Electromagnetic circuits are selectively energized, depending upon the relation of actual vehicle speed to the set vehicle speed, to drive the throttle toward the open or closed throttle position until the actual vehicle speed is within limits defined by the pair of contacts. It is an important feature of the invention that the sequence of operation includes the sensing of the possibility of a speed error opposite to that which is being utilized to change the throttle valve position, so as to quickly counteract any excessive overspeed or underspeed errors. The system also preferably employs desirable safety features including a disengaging arrangement actuated by the brake pedal and requiring a manual reset by the operator before the system is again operable to control the throttle valve, and an accelerator pedal override arrangement which momentarily disengages the drive clutch and permits free manual control until the accelerator pedal is released, after which the system will again be in control.

In the drawings:

FIGURE 3 is a view of the drive portion of the system, with parts broken away and in section, taken in the direction of arrows 3—3 of FIGURE 5.

FIGURE 4 is a fragmentary section view of one of the one way face gear drives forming a part of the drive mechanism of FIGURE 3, taken in the direction of arrows 4—4 of that figure.

FIGURE 5 is a view of the mechanism of FIGURE 3 taken in the direction of arrows 5—5 of that figure and having parts broken away and in section.

FIGURE 6 is a fragmentary view with parts broken away and in section of a portion of the engage clutch taken in the direction of arrows 6—6 of FIGURE 5.

Figure 1:
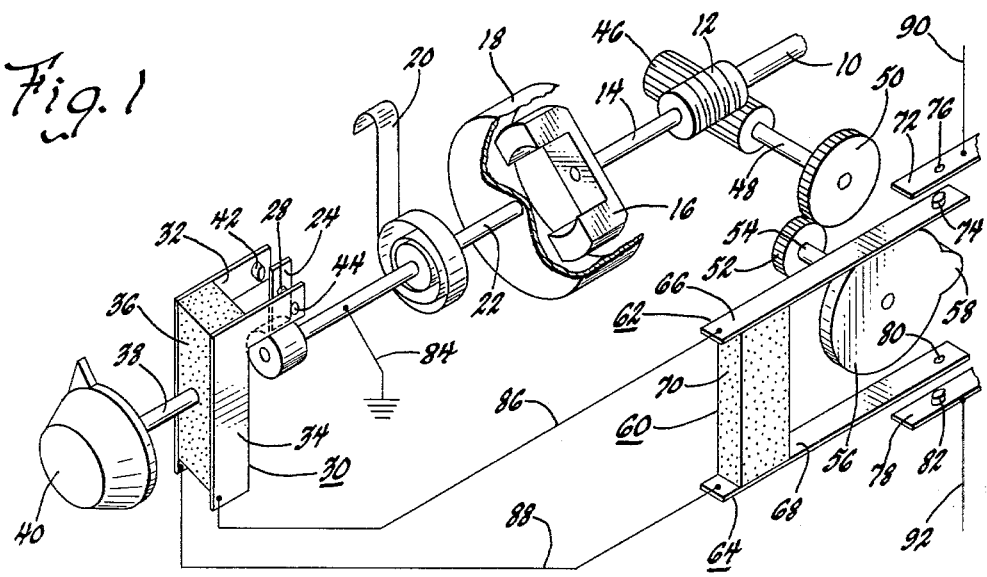
FIGURE 1 is a schematic representation of the controller mechanism embodying the invention, with parts being shown in perspective and broken away and in section.

The controller portion of the system illustrated in FIGURE 1 includes a drive element 10 which may be a suitable flexible cable drive of the type commonly employed to drive speedometers. Element 10 is connected to drive worm gear 12 and shaft 14. Shaft 14 is connected to a vehicle speed responsive switching function generator. The generator includes a drag cup magnet 16 which is driven by shaft 14 and is arranged to drive the drag cup 18 in the usual manner so as to give an indication of vehicle speed. Drag cup 18 is driven against the force of the drag cup return spring 20 which is suitably connected to the drag cup shaft 22 for this purpose. An actual vehicle speed indicating element is provided on shaft 22 in the form of a contactor 24 provided with opposite contacts 26 and 28. A set speed drum 30 is schematically illustrated as being formed by plates 32 and 34 secured to an insulated spacer 36 which is mounted to be rotatably driven by shaft 38 to which the set speed knob 40 is secured. Movement of knob 40 provides a set speed input for the speed responsive switching function generator. Contacts 42 and 44 are positioned on plates 32 and 34 so that they are respectively engageable with the contactor contacts 26 and 28. The spacing of contacts 42 and 44 determines the speed error range and sets the upper and lower limits of the range, with the desired set speed being substantially at the center of the range. It has been found to be desirable to set the speed error range at approximately 1 m.p.h. so that the upper and lower limits of the speed error range are each approximately ½ m.p.h. from the desired set speed.

Worm gear 12 is arranged to drive gear 46 and the gear shaft 48 in accordance with vehicle speed. These gears may provide a reduction drive. Shaft 48 in turn drives a reduction gear arrangement including gears 50 and 52, with the arrangement being a step-up function so that the shaft 54 driven by the output gear 52 is driven faster than shaft 48. Shaft 54 is connected to drive a camming cam 56 which is provided with a switch actuating lobe 58. A timed switch assembly 60 is actuated by the timing cam 56 and includes the cyclically opened and closed switches 62 and 64. These switches include spring arms 66 and 68 which are mounted on an insulated separator 70 so that the arms may be engaged by lobe 58 to flex the arms and close switches 62 and 64 during such engagement. The spring arms act to open the switches when not engaged by cam lobe 58. Switch 62 includes a contact arm 72 and contacts 74 and 76 respectively mounted on arms 66 and 72. Switch 64 includes contact arm 78 and contacts 80 and 82 respectively mounted on arms 68 and 78.

An electrical lead 84 connects contactor arm 24 to ground. Electrical lead 86 connects plate 34, and therefore contact 44, to spring arm 66, and therefore to contact 74. Electrical lead 88 connects plate 32, and therefore contact 42, to spring arm 68, and therefore to contact 80. Electrical lead 90 is connected to arm 72, and therefore contact 76, and to one of the ratchet drive electromagnets to be described. Electrical lead 92 is connected to arm 78, and therefore to contact 82, and to the other ratchet drive electromagnet to be described.

The drive mechanism 94 of FIGURES 3 and 5 is mounted adjacent the carburetor 96 and includes a housing 98. A bracket 100 is provided on which the ratchet drive wheel mechanisms are mounted. A bracket extension 102 provides a suitable mounting for the electromagnets which energize the ratchet drive mechanisms for the wheels. Shaft 104 is rotatably mounted in bracket 100 and has a gear 106 secured thereto. Ratchet wheel 108 is rotatably mounted on an enlarged portion of shaft 104 and is provided with face gear teeth 110 which are engaged with teeth 112 formed on the spider face gear 114. Gear 114 is secured to shaft 104. The other ratchet wheel 116 is also rotatably mounted on the enlarged portion of shaft 104 in spaced relation to wheel 108. Face gear teeth 118 are provided on one side of wheel 116 and are engaged by the gear teeth 120 of the spider face gear 122, which is secured to shaft 104. A spring 124 is positioned about shaft 104 intermediate wheels 108 and 116 and urges the face gear teeth associated with each wheel into engagement. As is better shown in FIGURE 4, the face gear teeth 118 of ratchet wheel 116 and the associated spider gear teeth 120 are arranged so that the spider gear 122 will be driven in one direction upon movement of ratchet wheel 116, but will ratchet over the teeth 118 when the spider face gear is driven in the other direction.

The ratchet wheel 108 is provided with peripheral teeth 126 which permit the gear to be driven in the clockwise direction as indicated by arrow 128 in FIGURE 3. This drive is obtained through the ratchet drive arm 130. Arm 130 is pivoted at 132 on an armature 134, which is in turn pivoted at 136 on bracket extension 102. The electromagnet 138 is also mounted on bracket extension 102 so that when it is energized it pivots armature 134 about the pivot 136 and moves ratchet drive arm 130 linearly in the direction of arrow 140 as shown in FIGURE 3. A suitable spring 142 urges arm 130 into drive engagement with wheel teeth 126 at all times. A wheel holding arm 144 is pivoted at 146 to a portion of bracket 100 and is provided with a holding tooth 148 which also engages teeth 126. Spring 150 urges tooth 148 into such engagement. Tooth 148 is so formed that it will ratchet out of engagement with teeth 126 so as to permit the clockwise driven movement of wheel 108, while preventing counterclockwise movement thereof. Armature 134 moves back to the position shown in FIGURE 3 when electromagnet 138 is deenergized, under influence of spring 152, thereby repositioning the ratchet drive arm 130 against another tooth 126 in preparation to drive gear 108 clockwise when electromagnet 138 is again energized.

A similar arrangement is provided for ratchet wheel 116 for drive in the opposite direction of rotation. The peripherial teeth 154 of this wheel are oppositely formed from those of teeth 126. They are engaged by the ratchet drive arm 156 and the holding tooth 158 of the associated wheel holding arm 160. The electromagnet armature 162 drives arm 156 when the electromagnet 164 is energized so as to rotate wheel 116 counterclockwise as indicated by arrow 166 of FIGURE 3. Spring 168 returns armature 162 to the position shown in FIGURE 3 when electromagnet 164 is deenergized. The ratchet drive arrangement provides predetermined incremental step movements of the throttle valve powered by the electromagnets 138 and 164.

Gear 106 is in mesh with and drives gear 170 which is secured to a bushing 172 rotatably mounted on the throttle valve shaft 174. One side of bushing 172 is recessed to provide a seat for spring 176 and the bushing side surface surrounding the recess is formed with face teeth 178 which provide part of a clutch assembly 180. A bushing 182 generally similar to bushing 172 is non-rotatably secured to shaft 174 and is recessed to receive the other end of spring 176. Face teeth 184 formed on bushing 182 are positioned in engageable and disengageable relation to teeth 178 to provide the other part of the clutch assembly. FIGURE 6 shows the clutch tooth arrangement of this bushing.

Bushing 172 is axially slidable on shaft 174 and is normally held in a disengaged position by the force of spring 176. A clutch engaging mechanism 186 is provided which includes a clutch yoke 188 pivotally mounted on a stud 190 and is powered by the electromagnet 192. A suitable bracket 194 provides a mounting for stud 190 and electromagnet 192. A pin 196 acts as a stop for the yoke 188. The yoke includes a bifurcated end having arms 198 and 200 which engage one side of gear 170 and receive the end of bushing 172 and shaft 174 therethrough. Another arm 202 of the yoke 188 acts as an armature for the electromagnet 192. When the electromagnet 192 is deenergized, the yoke and clutch are in the position shown in FIGURE 5. Spring 176, acting through bushing 172 and gear 170, holds the yoke against stop 196 and the clutch teeth 178 and 184 are disengaged. In this condition the throttle valve 204 of the carburetor 96 is movable through the manually actuated linkage 208 in the usual manner by operation of the accelerator pedal 210. Gear 170 does not move with manual movement of shaft 174. When the electromagnet 192 is energized yoke 188 pivots about stud 190 in a clockwise direction as seen in FIGURE 5 so that yoke arms 198 and 200 move gear 170 and bushing 172 axially against the force of spring 176 to engage the clutch 180. Electromagnet 192 is energized at all times when the speed maintaining assembly is armed. Thus any movement of gear 106 transmitted to gear 170 is transmitted through shaft 174 to move the throttle valve 204 in the carburetor intake passage 212.

Figure 2:
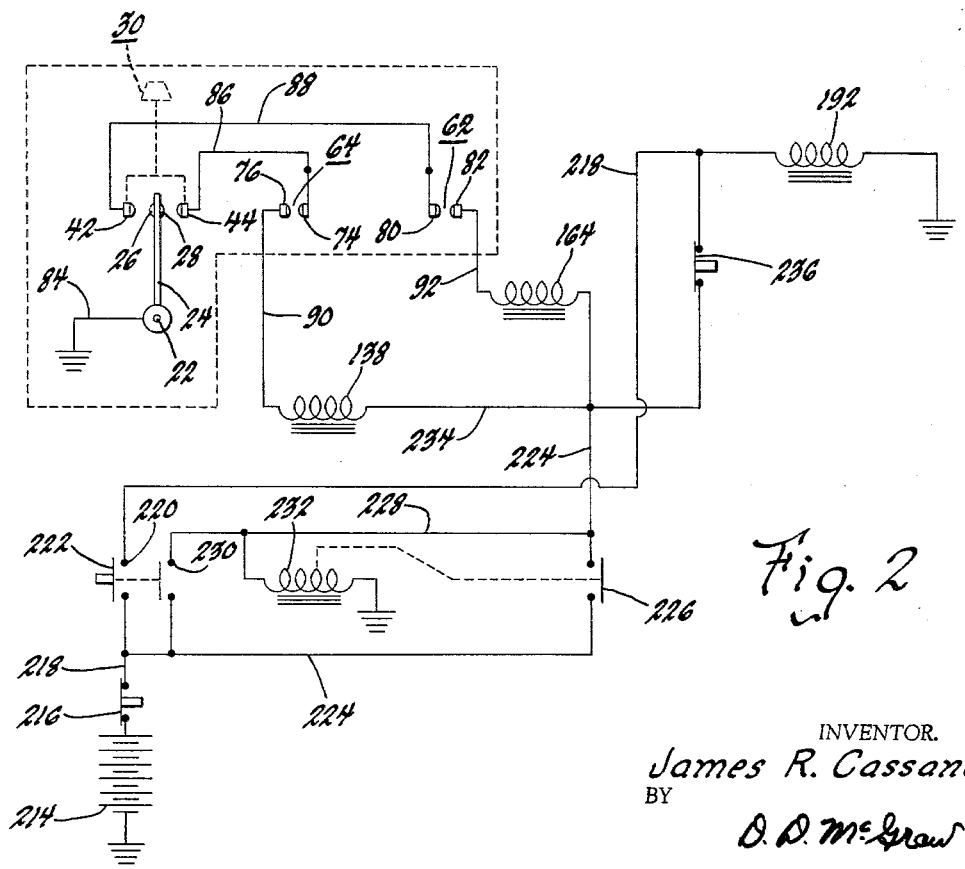
FIGURE 2 is an electrical diagram of the system embodying the invention.

As shown in FIGURE 2, electromagnet 192 is energized when it is desired to arm the assembly and when certain other conditions are present. The electrical system includes a source of electrical energy schematically illustrated by the battery 214. A normally closed switch 216 is provided in the battery output lead 218. Switch 216 is open at any time when the vehicle brake system is applied. Lead 218 also contains one set of contacts 220 of a normally open momentary switch 222 in series with switch 216. Lead 218 then continues in series to electrically connect with the electromagnet 192. Thus when the vehicle brakes are released, permitting switch 216 to be closed, the operator engages clutch 180 by manually closing contacts 220. A holding circuit is provided which includes an electrical lead 224 connected to lead 218 intermediate switch 216 and contacts 220 and including a normally open switch 226. Lead 224 continues beyond switch 226 and is connected to one side of electromagnet 164, the other side of which is connected to electrical lead 192 as earlier described. Another electrical lead 228 electrically connects with another set of contacts 230 forming a part of switch 222 and through these contacts is connected with the lead 224 between lead 218 and switch 226. Holding relay 232 is mechanically connected to close switch 226 when energized and is electrically connected to ground at one end and to lead 228 at the other end intermediate switch 226 and contacts 230. Thus when momentary switch 222 is closed, relay 232 is energized to close switch 226. Upon release of switch 222, the holding circuit is maintained in the energized condition through switch 226, as is electromagnet 192. Electrical lead 234 is electrically connected with lead 224 intermediate electromagnet 164 and switch 226 and connected with one end of electromagnet 138, the other end of which is connected to lead 90 as earlier described. Lead 234 is also connected through a normally closed switch 236 to electrical lead 218 intermediate momentary switch contacts 220 and electromagnet 192. Switch 236 is opened by throttle advancing movement of the accelerator pedal 210 when the operator desires to manually accelerate the vehicle beyond the speed being maintained. Switch 236 operates when opened to deenergize electromagnet 192 since the momentary switch 222 is opened and the only supply of electrical energy to the electromagnet 192 is through switch 236. The deenergization of electromagnet 192 has no electrical effect on electromagnets 138 and 164 or holding relay 232, however. Thus while the vehicle operator is accelerating by use of the accelerator pedal, the system operates up to the clutch 180 but cannot in fact control movement of the throttle valve since this clutch is disengaged. However, when the operator releases the accelerator pedal, switch 236 closes to reenergize electromagnet 192 and engage clutch 180. Since the remainder of the system was maintained operative, it immediately takes control and moves the throttle valve so as to bring the vehicle to the set speed.

A typical cycle of operation of the system when it is in the process of controlling the vehicle speed occurs when the actual vehicle speed reaches one of the speed error limits set by drum 30 to close contact 28 with either contact 42 or contact 44. If the speed is above the set speed, contact 28 will engage contact 44, thus arming the system to contact 74 of one of the timing switches. The timing cam 56, being driven by actual vehicle speed so that its lobe 58 engages spring arms 66 and 68 in a cyclic frequency proportional to actual vehicle speed, will cause contact 74 to engage contacts 76 and energize electromagnet 138. The signal which energizes the electromagnet has a constant value which is of sufficient power to operate the electromagnet. Its strength depends upon the electrical resistance characteristics of the associated circuit and the electrical power of battery 214. Its strength is independent of the amount of speed error. Energization of electromagnet 138 will drive ratchet wheel 108 in the direction of arrow 128 and this motion is transmitted through gears 106 and 170, clutch 180, and shaft 174 to move throttle valve 204 toward the closed throttle position. As timing cam 56 continues to rotate contacts 74 and 76 will open, deenergizing electromagnet 138 and allowing spring 152 to move ratchet drive arm 130 to such a position that it can further actuate ratchet wheel 108 upon the next energization pulse of electromagnet 138. Cam 56 then closes contacts 80 and 82, thus sensing the possibility of an underspeed signal having been given by contacts 28 and 42. If no such signal is present, ratchet drive electromagnet 164 is not energized and the throttle valve is not moved. The timing cam then again closes contacts 74 and 76 and senses for another generated error signal indicating the necessity for further closing the throttle valve. This cycle continues to occur until arm 24 is so positioned by the actual vehicle speed input that neither contact 42 nor contact 44 engages contact 28 and no error signal is generated. The vehicle speed will then again be substantially at the desired set speed. A similar cycle occurs if the actual vehicle speed is less than the desired set speed.

The system has been found to operate in a very satisfactory manner when the permissive speed error range is approximately 1 m.p.h. and when timing cam 56 is so geared as to complete one revolution each 0.4 second when the vehicle is traveling at 50 m.p.h. Of course, this cyclic frequency changes as vehicle speed changes, and is therefore proportional to actual vehicle speed. Thus cam 56 and switches 62 and 64 control the incremental energization of the electromagnets 138 and 164 at a cyclic frequency proportional to actual vehicle speed.

In the claims:

1. A position seeking vehicle engine throttle control system for maintaining a set vehicle speed, said control system comprising; a vehicle speed responsive switching function generator having a set vehicle speed input and an actual vehicle speed input, means generating a vehicle overspeed first signal at a predetermined vehicle overspeed and a vehicle underspeed second signal at a predetermined vehicle underspeed, first and second signal transmitting means, independently transmitting said signals from said generating means, and means cylically interrupting said first and second signal transmitting means; first and second power means respectively receiving first and second signals and actuated by the associated signals received thereby to respectively move the vehicle engine throttle toward the closed position and the open position in steps controlled by said interrupting means to position the engine throttle so as to maintain actual vehicle speed within limits defined by the speed range between the predetermined vehicle overspeed and underspeed and the set speed.

2. A method of repositioning a vehicle engine throttle valve in accordance with a determined actual vehicle speed error from a set vehicle speed, said method comprising the steps of: establishing overspeed and underspeed limits of a speed error range containing a set vehicle speed; generating an overspeed error signal only when the overspeed limit of the speed error range is exceeded and an underspeed error signal only when the underspeed limit of the speed error range is exceeded; alternately, powering a vehicle engine throttle valve to a new position by the generated error signal to change the vehicle speed toward the set vehicle speed, and interrupting the generated error signal; and sensing for the presence of the underspeed error signal during interruption of the overspeed error signal and the presence of the overspeed error signal during interruption of the underspeed error signal.

3. In a vehicle speed maintaining system, an overspeed signal first circuit and an underspeed signal second circuit, means having a reference vehicle speed input and an actual vehicle speed input for generating an overspeed error constant value signal in said first circuit when the actual speed input is greater than the reference speed input by a predetermined amount and an underspeed error constant value signal in said second circuit when the actual speed input is less than the reference speed input by a predetermined amount and no error signal when the actual speed input is intermediate speed error limits defined by said predetermined amounts, vehicle engine throttle valve closing means connected in said first circuit and vehicle engine throttle valve opening means connected in said second circuit, said closing and opening means being actuated when a signal is received thereby through the circuit connected therewith, and means for alternately opening and closing said circuits at a cyclic frequency proportional to actual vehicle speed.

4. A speed maintaining system for a vehicle having the speed thereof controlled by an engine throttle, said system comprising; an actual vehicle speed responsive member; means having first and second spaced contacts positionable to be contacted by said member respectively at the upper and lower limits of a speed error sensing range containing a desired vehicle speed to be maintained; a first circuit containing, a source of power, said member, said first contact, a first cyclically opened and closed switch, and a first power element for driving the engine throttle in a vehicle speed decreasing direction; a second circuit containing said source of power, said member, said second contact, a second cyclically opened and closed switch, and a second power element for driving the engine throttle in a vehicle speed increasing direction; and means cyclically opening and closing said switches in opposite phase relation.

5. The system of claim 4, said switch cyclically opening and closing means being driven in accordance with actual vehicle speed.

6. The system of claim 4, said first and second circuits having a common normally open relay closed switch, and a holding relay circuit having said normally open relay closed switch therein and a vehicle operator operable momentary switch for energizing the holding relay circuit to close and hold closed said relay closed switch to arm said first and second circuits.

7. A vehicle road speed control system comprising, an engine power control member, means setting up vehicle speed error sensing speed range in relation to a desired vehicle speed, power means selectively moving said engine control member in predetermined incremental steps for selectively increasing and decreasing engine power, means sensing actual vehicle speed and comparing it to said desired vehicle speed to establish the existence of a speed error in a speed error sensing speed range and selectively energizing said power means incrementally to increase engine power when actual vehicle speed is below said desired vehicle speed and to decrease engine power when actual vehicle speed is above said desired vehicle speed.

8. The system of claim 7 further comprising means cyclically controlling the incremental energization of said power means at a cyclic frequency proportional to actual vehicle speed.

9. A vehicle road speed control system comprising, means setting up a desired vehicle speed and a vehicle low speed error sensing speed range and a vehicle high speed error sensing speed range on opposite sides of the desired vehicle speed, power means selectively moving an engine power control member in predetermined incremental steps for selectively increasing and decreasing engine power to control vehicle road speed, means sensing actual vehicle speed and determining whether it is in the low or high speed error sensing speed range or at the desired vehicle speed and selectively energizing said power means incrementally to increase engine power when actual vehicle speed is in the low speed error sensing speed range and to decrease engine power when the actual vehicle speed is in the high speed error sensing speed range to maintain a constant vehicle road speed substantially at the desired vehicle speed.

10. The system of claim 9, said sensing and determining and selectively energizing means alternately comparing actual vehicle speed with said low and high speed error sensing speed ranges and selectively energizing said power means accordingly after each comparison indicating that actual vehicle speed is in a speed error sensing speed range.

References Cited by the Examiner
UNITED STATES PATENTS

| | | |
|---|---|---|
| 867,197 | 9/07 | Hamm. |
| 2,477,599 | 8/49 | Hammann _____ 74—157 X |
| 2,895,340 | 7/59 | Nicolaus _____ 74—142 |
| 2,973,051 | 2/61 | Teetor _____ 180—82.1 |
| 2,993,383 | 7/61 | Airdner _____ 74—142 |
| 3,028,939 | 4/62 | Glick _____ 180—82.1 X |
| 3,087,340 | 4/63 | McMurray et al. ____ 180—82.1 X |
| 3,088,005 | 4/63 | Brown _____ 180—82.1 X |
| 3,088,538 | 5/63 | Brennan et al. _____ 180—82.1 |

A. HARRY LEVY, *Primary Examiner.*